J. NEWTON.
ANIMAL HOISTING APPARATUS.
No. 111,671. Patented Feb. 7, 1871.
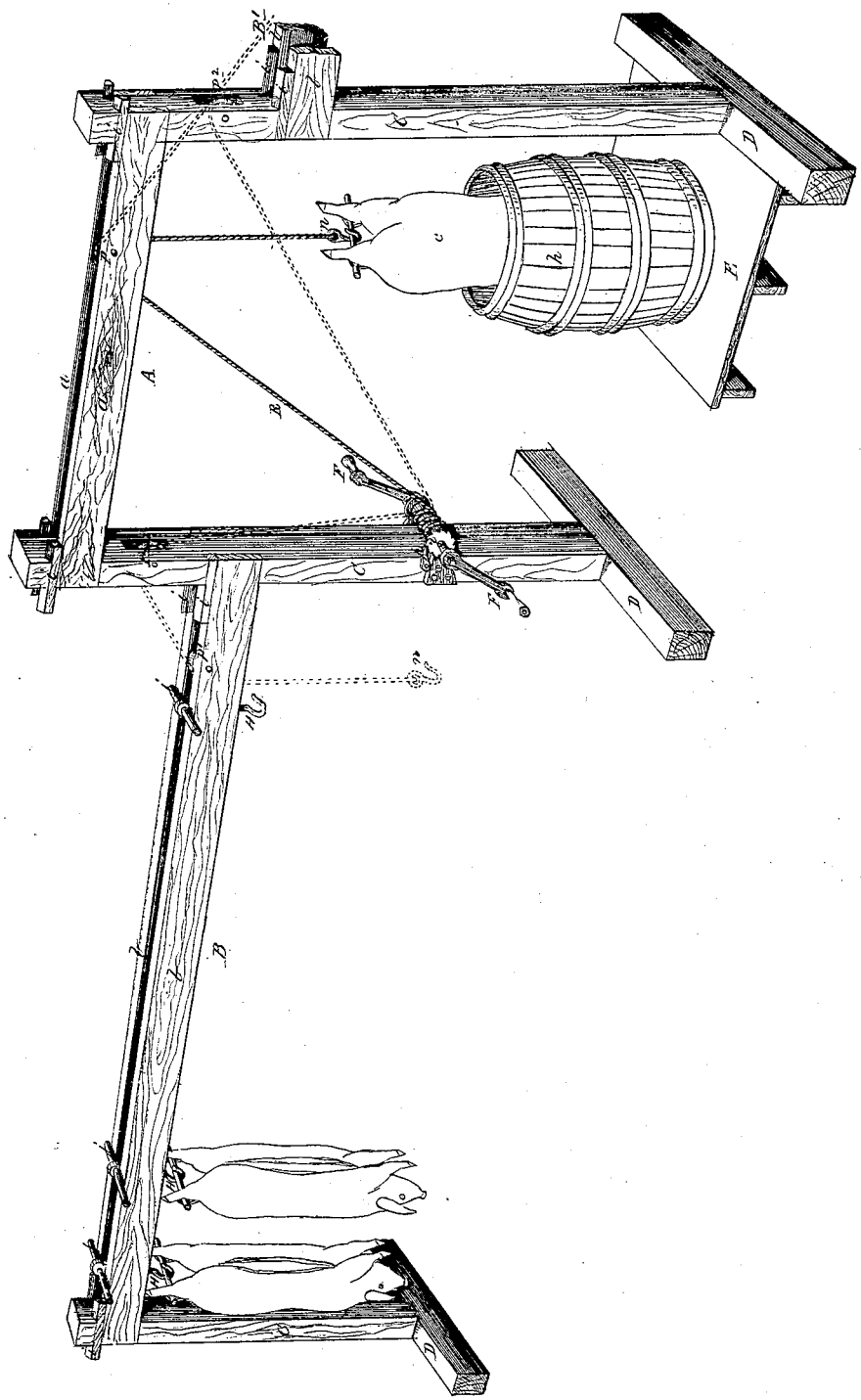

United States Patent Office.

JASON NEWTON, OF MARENGO TOWNSHIP, MICHIGAN.

Letters Patent No. 111,671, dated February 7, 1871.

IMPROVEMENT IN ANIMAL-HOISTING APPARATUS.

The Schedule referred to in these Letters Patent and making part of the same.

I, JASON NEWTON, of the township of Marengo, in the county of Calhoun and State of Michigan, have invented certain Improvements in Gallows and Derrick for facilitating the scalding, skinning, dressing, and weighing Animals, of which the following is a specification.

My invention relates to the arrangement of one or more long gallows-frames with a shorter and higher gallows, employed in combination with a winch, and with duplicate or triplicate sets of pulleys, so that the hoisting-rope may be transferred from one gallows to the other; said gallows-frames being so connected that the several parts composing them may be readily taken apart and reconstructed for portable use; the object of my said invention being to consolidate in one connected arrangement improved facilities to any required extent for the various consecutive manual operations to prepare animals, after they are killed, for cutting up for home use as food, or for the market.

The accompanying drawing represents my invention in perspective, of which the following is a

General Description.

A represents the higher gallows, which, as indicated by the hogs head $h$, and the suspended animals $c$, is mainly for the purpose of manipulating hogs in the scalding and scraping process; although it is equally adapted and designed for the suspension of beef animals while being skinned, dressed, and weighed.

The long gallows, as shown at B, is designed chiefly for the hanging up of hogs to be dressed and cooled, as fast as they are scalded and scraped in the gallows A; and should more hanging space be required than one wing can furnish, another wing may be connected to the gallows A, as shown by B', where the beams are shown as broken short off, for want of room.

C are the gallows-posts, which are framed at the bottom into the center of the cross-sills D, (detachably or permanently,) to support and steady the gallows sidewise.

$a\,a\,b\,b$ represents the gallows-beam planks, arranged in pairs, which I usually connect to the posts by inserting the ends of said planks in dovetail-shouldered gains, room being provided to drive in a stout wooden key fitted between the upper beveled shoulder of the gain and the top edge of the beam-plank, as seen at $i\,i\,i$.

Sufficient space should be left between the beam-planks for the hanging of the hoisting-pulleys P P¹, and for the free passage between of the sliding gambrel-hooks H and the hoisting-hook $n$.

S is the winding-shaft or drum, carrying the hoisting-rope R, said shaft being hung in suitable bearings attached to one of the posts supporting the high gallows A, and furnished with a hand-crank, F, at one or both ends.

A ratchet, $r$, and pawl, $p$, hold the load in suspension at any required height.

P² are hoisting-pulleys, hung in mortises cut through the high posts, as shown; and H represents one of the sliding gambrel-hooks ready to receive the scraped hog $c$, such hooks to range with the gallows, as seen, or to stand at a right angle, as may be preferred.

The cross-bar $j$ of the gambrel-hook may be mounted on flanged rollers and converted into a carriage to carry the animal along the gallows, if deemed best.

I will now proceed to describe the operation as applied to hogs, according to my usual mode of manipulation; premising that such mode may be varied to suit existing circumstances, necessities, or tastes.

A platform, E, of any suitable kind may be placed on or sunk under the ground below the gallows A, to support the barrel $h$, containing hot water.

The hoisting-rope R is rove from the winch-drum over the pulley P immediately above, and the dead hog, suspended to the hook $n$, is elevated and lowered, by the operation of the winch, into and from the scalding water, and, by the aid of the ratchet and pawl to hold the hog occasionally in a suitable elevation, it is scalded, scraped, and washed clean.

When this is accomplished, the animal is lowered on a skid or plank, (not shown,) is unhooked, and hauled around the post under the gallows B.

The operator now detaches the hoisting-rope from the pulley P, and passing the hook and rope through the mortise and over the pulleys P² and P¹, as shown by dotted lines at the left, he hooks into the gambrel-stick of the scraped hog, and by aid of the winch elevates and transfers the animal from the hoisting to the gambrel-hook H; when the rope is unhitched and returned to its first-described position, to elevate the next hog for the scalding and scraping process.

While this is being done, another operator guts and dresses the hog on the gambrel-hook, weighs it by suspended steelyards, (not shown,) marks the weight, and runs it along the gallows B alongside its fellows, to cool.

Should another gallows, B', be required to dress and suspend all the animals killed, the free end of the hoisting-rope may be transferred to it, in either of the modes indicated by the dotted lines at the right; and any deflection of the gallows-beams may be prevented by an occasional prop.

Swivel or fast pulleys may be attached at any convenient points in the frame, to aid in moving the animals, and a brace or braces if deemed best; but the gallows, when well constructed and keyed up, will not require bracing, as it is self-supporting, being loaded in a direct central line.

My arrangement of the higher and lower gallows, under the operation of a single hoisting-winch, fills a certain want at but little expense, and saves a vast amount of labor of a very dirty and otherwise disagreeable kind.

I claim as my invention—

The higher and lower gallows-frames A and B, (detachable or not,) in combination with a winch and its appurtenances, and with pulleys P P¹ P², and gambrel-hooks H, all constructed, arranged, and operated substantially as and for the purpose set forth.

JASON NEWTON.

Witnesses:
MILES TOWNSEND,
THEODORE TOWNSEND.